(12) United States Patent
Qiu et al.

(10) Patent No.: US 11,148,322 B2
(45) Date of Patent: Oct. 19, 2021

(54) MATERIAL DISTRIBUTION APPARATUS AND METHOD OF PREPARING ARTIFICIAL STONE PLATE USING THE SAME

(71) Applicant: Feizhou Deng, Guangdong (CN)

(72) Inventors: Jianping Qiu, Guangdong (CN); Zhongyuan Li, Guangdong (CN); Shiyang Zhu, Guangdong (CN)

(73) Assignee: Veegoo Technology Co., Ltd., Guangdong (CN)

( * ) Notice: Subject to any disclaimer, the term of this patent is extended or adjusted under 35 U.S.C. 154(b) by 475 days.

(21) Appl. No.: 16/083,644

(22) PCT Filed: Mar. 25, 2016

(86) PCT No.: PCT/CN2016/077336
§ 371 (c)(1),
(2) Date: Sep. 10, 2018

(87) PCT Pub. No.: WO2017/152436
PCT Pub. Date: Sep. 14, 2017

(65) Prior Publication Data
US 2020/0298444 A1    Sep. 24, 2020

(30) Foreign Application Priority Data

Mar. 8, 2016    (CN) .......................... 201610129855.3

(51) Int. Cl.
*B28B 13/02* (2006.01)
*B28B 5/02* (2006.01)
*B28B 11/24* (2006.01)

(52) U.S. Cl.
CPC .............. *B28B 13/02* (2013.01); *B28B 5/021* (2013.01); *B28B 11/24* (2013.01)

(58) Field of Classification Search
CPC ......... B28B 13/02; B28B 5/021; B28B 11/24; B28B 1/082
See application file for complete search history.

(56) References Cited

U.S. PATENT DOCUMENTS 2,621,151 A  * 12/1952 Fredrik Carlsson ...... C10B 7/06
                                                      201/32
5,145,627 A  *  9/1992 Berion .................... B28B 5/027
                                                      264/113
(Continued)

FOREIGN PATENT DOCUMENTS

CN    202540466 U  * 11/2012
CN    202540466 U    11/2012
(Continued)

OTHER PUBLICATIONS

European Patent Office, Communication pursuant to Rule 164(1) EPC, Application No. 16893085.7, dated Sep. 25, 2019, 12 pages.
(Continued)

*Primary Examiner* — Jacob T Minskey
*Assistant Examiner* — Virak Nguon

(57) ABSTRACT

A material distribution apparatus and preparing an artificial stone plate using the material distribution apparatus includes a belt material distribution device including a material distribution hopper and a conveying belt. The conveying belt is located at a lower portion of the material distribution hopper. An upper surface of the conveying belt is inclined. The material distribution hopper has a first wall and a second wall. The first wall is an inclined wall with an upper end away from the second wall. A discharge outlet is provided below the second wall. An upper portion of the second wall is vertically mounted, and a lower portion of the second wall has a circular arc portion and a discharge portion which forms the discharge outlet with a surface of the conveying belt therebetween.

15 Claims, 2 Drawing Sheets

(56) References Cited

U.S. PATENT DOCUMENTS

| | | | |
|---|---|---|---|
| 5,477,957 A | 12/1995 | Bold | |
| 5,985,061 A * | 11/1999 | Doi | B28B 1/522 |
| | | | 156/220 |
| 8,980,149 B2 * | 3/2015 | Ko | B29C 67/243 |
| | | | 264/109 |
| 2006/0237088 A1 | 10/2006 | Morey et al. | |
| 2015/0314475 A1 * | 11/2015 | Banus | B28B 3/022 |
| | | | 425/405.1 |

FOREIGN PATENT DOCUMENTS

| | | | |
|---|---|---|---|
| CN | 203187050 U | | 9/2013 |
| CN | 203512705 U | * | 4/2014 |
| CN | 203512705 U | | 4/2014 |
| CN | 203527635 U | | 4/2014 |
| CN | 104325539 A | | 2/2015 |
| CN | 204819896 U | * | 12/2015 |
| CN | 204819896 U | | 12/2015 |
| CN | 205364153 U | | 7/2016 |
| DE | 19749033 A1 | | 5/1999 |

OTHER PUBLICATIONS

International Search Report, Application No. PCT/CN2016/077336, dated Nov. 4, 2016, 2 pages.

* cited by examiner

MATERIAL DISTRIBUTION APPARATUS AND METHOD OF PREPARING ARTIFICIAL STONE PLATE USING THE SAME

CROSS REFERENCE TO RELATED APPLICATIONS

This application claims the benefit of Chinese patent Application No. 201610129855.3, filed on 2016 Mar. 8, which is incorporated by reference in its entirety.

FIELD OF THE INVENTION

The present invention relates to the technical field of artificial stone plate production, and in particular to a material distribution apparatus and a method of preparing an artificial stone plate using the same.

BACKGROUND OF THE INVENTION

Artificial stones usually refer to artificial stone solid facestock, artificial quartz stone, artificial agglomerated stone, etc, and components thereof are mainly resin, aluminum powder, pigment and hardening agent. At present, some material distribution machines for artificial stone plate successively appear in the market. The material distribution machines overcome the disadvantages of low manual material distribution efficiency and great consumption. However, mechanical material distribution will cause the problems that raw materials of artificial stones are adhered and agglomerated together on the machines and the material distribution is not uniform. For this reason, the prior application 201320622945.8 of the applicant provides an artificial stone plate belt material distribution machine which has good artificial stone plate material shattering, smooth material transportation, even material distribution and no adhesion between the material and a hopper. However, a second wall of the artificial stone plate belt material distribution machine is a structure which adopts an inclined wall, an inclination direction and a discharge direction thereof are two opposite directions, which is disadvantageous for material transportation and causes the mixed materials to be easily blocked in the hopper, secondly, the capacity of the hopper is greatly reduced due to non-optimized arrangements of a first wall and a second wall.

Additionally, since a rubber mold with a receiving bottom is adopted in the existing artificial stone plate production method, wherein a bottom portion needs to be firstly coated with a demolding agent before material distribution and then the material distribution is performed, the uneven coating of the demolding agent will influence the demolding effect and speed and thus increase the production cost.

SUMMARY OF THE INVENTION

An object of the present invention is to provide a material distribution apparatus, which allows a downward pushing force along an inclination direction of a first wall of a material distribution hopper between the mixed materials, and facilitates fall of the materials at a discharge outlet such that the discharge outlet is not easily blocked.

Another object of the present invention is to provide a method of preparing an artificial stone plate by using the above material distribution apparatus, which has simple process, requires no demolding agent and has high material distribution efficiency.

In order to achieve the objects, the present invention adopts the following technical solutions:

A material distribution apparatus comprises a belt material distribution device including a material distribution hopper and a conveying belt; the conveying belt is located at a lower portion of the material distribution hopper;

an upper surface of the conveying belt is inclined;

the material distribution hopper comprises a first wall and a second wall; the first wall is an inclined wall with an upper end away from the second wall; a discharge outlet is provided below the second wall;

an upper portion of the second wall is vertically mounted, a lower portion of the second wall comprises a circular arc portion and a discharge portion which forms the discharge outlet with the surface of the conveying belt therebetween; and a tangent direction of a tail end of the discharge portion is in parallel with the upper surface of the conveying belt.

For further illustration, the material distribution apparatus comprises a material distribution frame located below the belt material distribution device.

For further illustration, the material distribution apparatus further comprises an auxiliary material distribution device provided between the belt material distribution device and the material distribution frame, and a feed inlet of the auxiliary material distribution device is located right below a discharge end of the belt material distribution device.

For further illustration, the auxiliary material distribution device has the same structure with the belt material distribution device.

For further illustration, the material distribution apparatus further comprises a transporting device which is used for conveying the material distribution frame, the transporting device being provided below the belt material distribution device located at an upstream position of a transporting direction of the transporting device.

For further illustration, the material distribution apparatus further comprises a cartridge-type material distribution device located at a downstream direction of the transporting direction.

For further illustration, the cartridge-type material distribution device is consisted of a cartridge and a pressing plate, the cartridge being horizontally placed and the pressing plate being provided at a bottom portion of the cartridge, and a bottom portion of the cartridge-type material distribution device is provided with a material outlet.

For further illustration, the material distribution apparatus further comprises a lifting device which is used for controlling the material distribution frame to be raised or lowered, wherein the lifting device is provided below the material distribution frame which is a quadrilateral frame with two sides being rotatably and compressed inwards.

For further illustration, a method of preparing an artificial stone plate by using the above material distribution apparatus comprises the following steps:

A. material distribution: sequentially stacking a leatheroid and a material distribution frame on a transporting device, transporting the leatheroid and the material distribution frame to a position below the belt material distribution device for material distribution through the transporting device, and performing pre-pressing through the material distribution apparatus to obtain a pre-pressed green body with the leatheroid at a bottom portion;

B. pressing: removing the material distribution frame, feeding the pre-pressed green body with the leatheroid at the bottom portion into a pressing machine, covering an upper surface of the pre-pressed green body with another layer of leatheroid and thereafter performing pressing through the pressing machine;

C. vacuum hardening: performing vacuum vibration and hardening for the stone plate pressed and formed in step B to obtain a crude product;

D. leatheroid removal: removing the leatheroid on the upper and lower surfaces of the crude product to obtain the artificial stone plate.

For further illustration, before removing the material distribution frame in step B, individual frame plates of the material distribution frame are compressed inwards.

The material distribution apparatus of the present invention has the following beneficial effects of: 1) allowing a downward pushing force along an inclination direction of the first wall of the material distribution hopper between the mixed materials, and facilitating fall of the materials at the discharge outlet such that the discharge outlet is not easily blocked; 2) adopting the belt material distribution device and realizing uniform material distribution; and 3) effectively avoiding repetitive material distribution upon restarting.

The beneficial effects of using the method of preparing the artificial stone plate by using the above material distribution by the present invention are: no mold is used by a combined use of the leatheroid and the material distribution frame, and no demolding agent needs to be used before material distribution, the process is simpler, which can avoid influencing the demolding effect and speed when the demolding agent is not uniformly coated, and thus increase the material distribution efficiency.

For further illustration, the material distribution apparatus provided by the present invention is further applicable to an artificial stone production process in which ceramic powder or cement is used as an adhesive.

Figure 1:
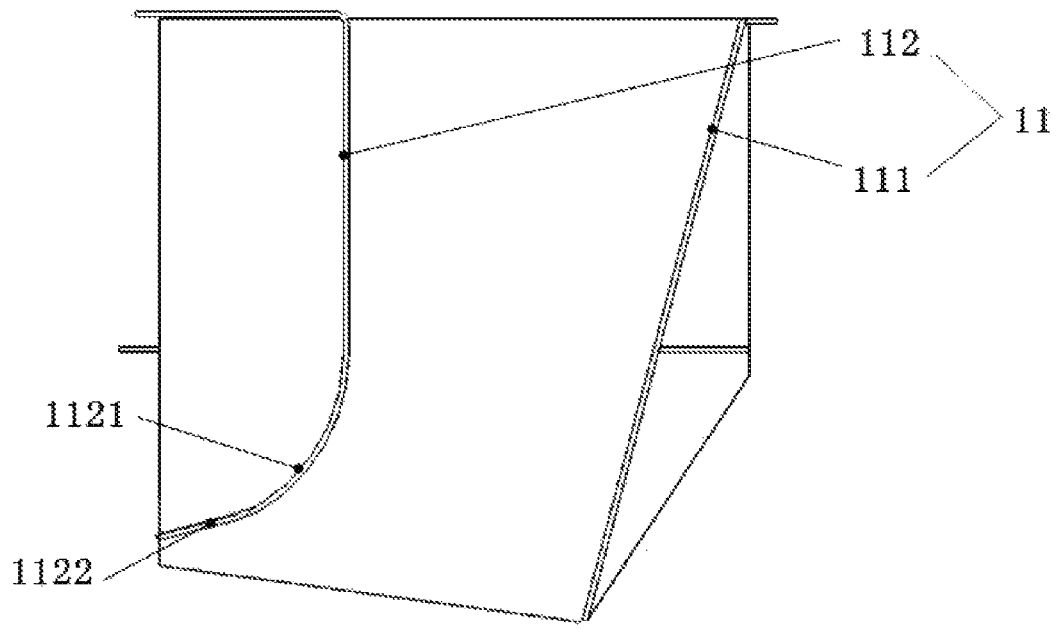
FIG. 1 is a sectional structural schematic diagram of a material distribution hopper of one embodiment of the present invention.

Therein, 1—belt material distribution device; 11—material distribution hopper; 12—conveying belt; 111—first wall; 112—second wall, 113—discharge outlet; 1121—circular arc portion; 1122—discharge portion; 121—poking plate assembly; 2—auxiliary material distribution device; 3—transporting device; 4—cartridge-type material distribution device 4; 41—cartridge; 42—pressing plate; 43—material outlet; 01—material distribution frame; 011—lifting device; 0111—pushing rod; 0112—switchover frame.

DESCRIPTION OF THE EMBODIMENTS

The technical solution of the present invention will be further described below in conjunction with the drawings and the embodiments.

A material distribution apparatus comprises a belt material distribution device 1 including a material distribution hopper 11 and a conveying belt 12; the conveying belt 12 is located at a lower portion of the material distribution hopper 11;

an upper surface of the conveying belt 12 is inclined;

the material distribution hopper 11 comprises a first wall 111 and a second wall 112; the first wall 111 is an inclined wall with an upper end away from the second wall 112; a discharge outlet 113 is provided below the second wall 112;

an upper portion of the second wall 112 is vertically mounted, a lower portion of the second wall 112 comprises a circular arc portion 1121 and a discharge portion 1122 which forms the discharge outlet 113 with the surface of the conveying belt 12; and a tangent direction of a tail end of the discharge portion 1122 is in parallel with the upper surface of the conveying belt 12.

Figure 3:
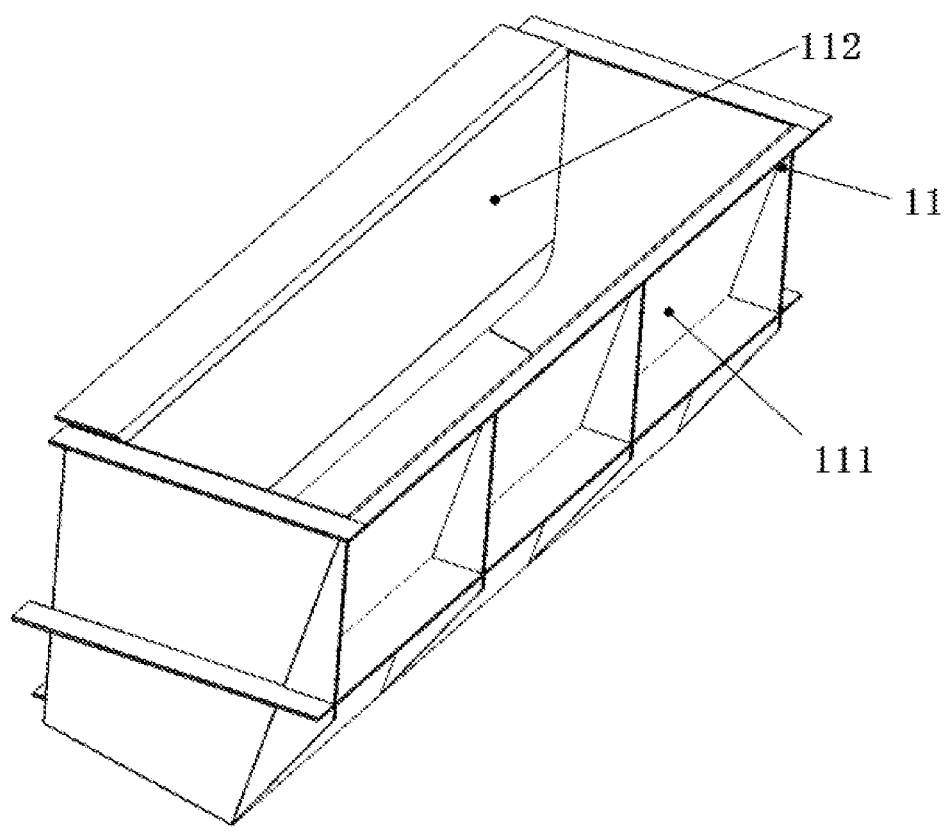
FIG. 3 is a structural schematic diagram of a material distribution hopper of one embodiment of the present invention.

As shown in FIG. 1 or FIG. 3, the inclined first wall 111 and the vertical second wall 112 are connected in parallel, are oppositely mounted and form the material distribution hopper 111. The inclination arrangement of the first wall 111 cause the mixed materials to have a downward pushing force along an inclination direction for the mixed materials below, which facilitates the fall of the materials at the discharge outlet 113, reduces the work done by the conveying belt 12 and effectively avoids blocking the discharge outlet by the mixed materials. By adopting a vertical wall for the second wall 112, the accumulation of the mixed materials is avoided. In addition, by adopting the inclination arrangement of the first wall 111, the capacity of the material distribution hopper 11 is also effectively increased.

The existing second wall 112 is a structure which adopts an inclined wall, the inclination direction thereof and the material discharge direction are two opposite directions, which is disadvantageous for transportation of the materials, the mixed materials in the material distribution hopper easily cause blockage, which causes the material distribution process unsmooth, and quite easily cause repetitive material distribution upon restarting, and further causes the material distribution to be non-uniform and problems such as non-uniform density of the stone plate finally occur.

For further illustration, an outer side of the first wall is provided with a reinforcing structure, which is helpful in improving the load-bearing capacity of the first wall and prolonging the service life of the material distribution hopper.

For further illustration, the material distribution apparatus comprises a material distribution frame 01 located below the belt material distribution device 1. A discharge end of the conveying belt 12 is provided with a poking plate assembly 121. By arranging the poking plate assembly 121, the materials conveyed by the conveying belt 12 are broken apart and uniformly fall into the material distribution frame 01. The poking plate assembly 121 is consisted of a poking plate shaft and a driving portion. The poking plate shaft is consisted of a rotating shaft and a plurality of poking plates which are regularly distributed on the rotating shaft. Two poking plates are provided on the rotating shaft as a group, the poking plates in the same group are symmetrically provided on the basis of an axis of the rotating shaft and an adjacent group of the poking plates are provided in a staggered manner.

For further illustration, the material distribution apparatus further comprises an auxiliary material distribution device 2 provided between the belt material distribution device 1 and the material distribution frame 01, and a feed inlet of the auxiliary material distribution device 2 is located right below a discharge end of the belt material distribution device 1.

Figure 2:
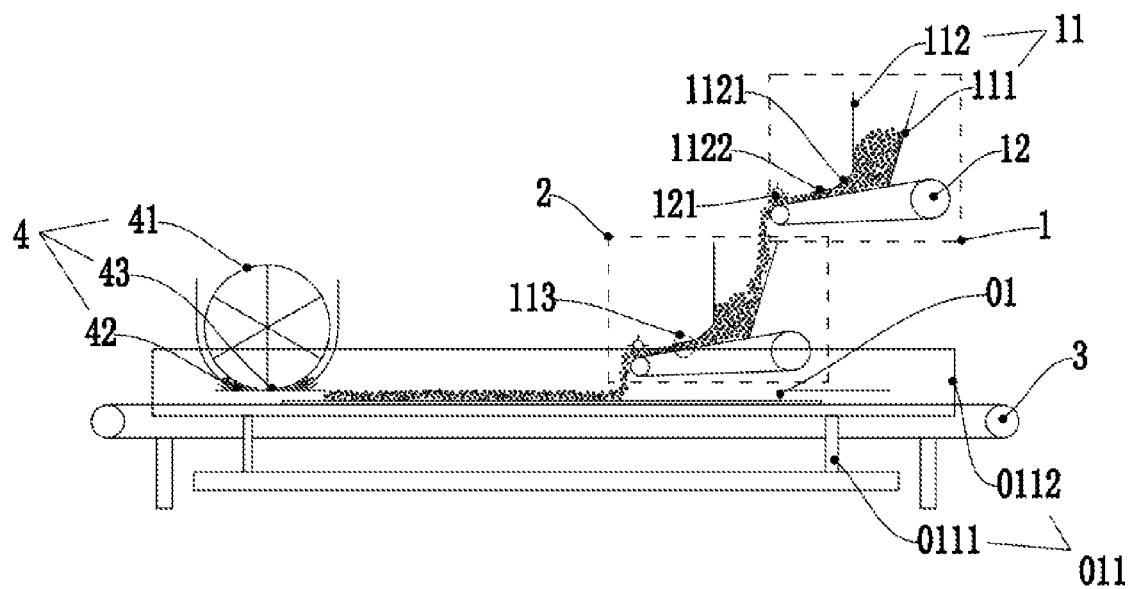
FIG. 2 is a structural schematic diagram of one embodiment of the present invention.

As shown in FIG. 2, the auxiliary material distribution device 2 is provided to further mix and break apart the materials falling from the belt material distribution device 1, such that the mixed materials can fall into the material distribution frame 01 more uniformly. In addition, when the discharge outlet of the existing single belt material distribution device 1 is blocked, the apparatus needs to be immediately stopped to avoid repetitive material distribution upon restarting the material distribution and to avoid non-uniform material distribution within the material distribution frame 01. On the original basis, the improvement of the present invention additionally provides an auxiliary material distribution device 2, which can effectively avoid the problem that the material distribution hopper 11 of the auxiliary material distribution device 2 still has materials therein when the discharge outlet of the belt material distribution device 1 at the upper portion thereof is blocked, the apparatus can be slowly stopped within a set buffer time and the repetitive material distribution upon restarting is effectively avoided.

For further illustration, the auxiliary material distribution device 2 has the same structure with the belt material distribution device 1. Therefore, the problem that the discharge outlet of the existing material distribution hopper 11 is easily blocked is avoided.

For further illustration, the material distribution apparatus further comprises a transporting device 3 which is used for conveying the material distribution frame 01, the transporting device 3 being provided below the belt material distribution device 1 located at an upstream position of a transporting direction of the transporting device 3.

The material distribution frame 01 is placed on the transporting device 3 and is transported forwards along the transporting device 3. When the material distribution frame 01 is conveyed to a station of the belt material distribution device 1 and is positioned below the belt material distribution device 1, the belt material distribution device 1 starts a material distribution action at this moment, the mixed materials for the artificial stone are discharged from the material distribution hopper 11 and fall onto the conveying belt 12 which runs synchronously to transport the artificial stone materials falling onto the conveying belt 12 towards the direction of the material distribution frame 01, and when transported to the discharge end of the conveying belt 12, the materials are broken apart by the poking plate assembly 121 and uniformly fall into the material distribution frame 01.

For further illustration, the material distribution apparatus further comprises a cartridge-type material distribution device 4 located at a downstream position of the transporting direction. By additionally providing the cartridge-type material distribution device 4, the materials within the material distribution frame 01 are compacted and filled, and the compactness of the stone plate is further improved. In addition, the variability of the texture of the material distribution can be increased.

For further illustration, the cartridge-type material distribution device 4 is consisted of a material cartridge 41 and a pressing plate 42, wherein the material cartridge 41 is horizontally placed, the pressing plate 42 is provided at a bottom portion of the material cartridge 41 and a bottom portion of the cartridge-type material distribution device 4 is provided with a material outlet 43.

The height of the cartridge-type material distribution device 4 is consistent with the height of the material distribution frame 01, the pressing plate 42 at the bottom portion thereof compresses the material distribution frame 01 to move forward to compact the materials within the material distribution frame 01, the materials in the cartridge 41 within the cartridge-type material distribution device 4 fall into the material distribution frame 01 when the cartridge-type material distribution device 4 displaces so as to fill material gaps in the material distribution frame 01, and thus complete a filling process of the cartridge-type material distribution device 4.

For further illustration, the material distribution apparatus further comprises a lifting device 011 which is used for controlling the material distribution frame 01 to be raised or lowered, the lifting device 011 is provided below the material distribution frame 01 which is a quadrilateral frame with two sides being rotatably and compressed inwards. The material distribution frame 01 is controlled by the lifting device 011 to move up and down on the transporting device 3. During material distribution, the material distribution frame 01 is lowered down to the surface of the transporting surface of the transporting device. The lifting device 011 lifts up the material distribution frame 01 to leave the surface of the transporting surface after completion of the material distribution, such that the mixed materials which are distributed on the leatheroid are not subjected to a limiting effect of the material distribution frame 01 and can be transferred to a next process along the transporting direction.

For further illustration, the lifting device 011 comprises a pushing rod 0111, an switchover frame 0112 and a lifting driver, the material distribution frame 01 is provided within the switchover frame 0112, and two sides of the switchover frame 0112 are connected to, through the pushing rod 0111, the lifting driver which controls the upward pushing or downward retraction movement of the pushing rod 0111 to whereby realize the lifting and lowering of the material distribution frame 01 on the transporting surface of the transporting device 3.

For further illustration, frame plates which can be turned inwards to realize compression are used by two sides of the material distribution frame 01, wherein the frame plates can compress and pre-press the edges of the mixed materials within the material distribution frame 01 to form a comparatively stable edge structure, such that the edges of the materials on the leatheroid will be not scattered after the material distribution frame 01 is removed.

For further illustration, inward-turning movements of the frame plates which can be turned inwards on two sides of the material distribution frame 01 are controlled by inward-turning driving cylinders which are provided on two sides of the switchover frame 0112.

A method of preparing an artificial stone plate by using the above material distribution apparatus comprises the following steps:

A. material distribution: sequentially stacking a leatheroid and a material distribution frame 01 on a transporting device 3, transporting the leatheroid and the material distribution frame 01 to a position below a belt material distribution device 1 for material distribution through the transporting device 3, and performing pre-pressing through the material distribution apparatus to obtain a pre-pressed green body with the leatheroid at a bottom portion;

B. pressing: removing the material distribution frame 01, feeding the pre-pressed green body with the leatheroid at the bottom portion into a pressing machine, covering an upper surface of the pre-pressed green body with another layer of leatheroid and thereafter performing pressing through the pressing machine;

C. vacuum hardening: performing vacuum vibration and hardening for the stone plate pressed and formed in step B to obtain a crude product; and D. leatheroid removal: removing the leatheroid on the upper and lower surfaces of the crude product to obtain the artificial stone plate.

The material distribution system adopts the leatheroid therein to receive the mixed materials and perform limiting material distribution on the mixed materials through the material distribution frame 01. A rubber mold with a receiving bottom is adopted in the existing artificial stone plate production method, wherein a bottom portion needs to be firstly coated with a demolding agent before material distribution and then the material distribution is performed. However, the present invention adopts the leatheroid as the receiving bottom, which can be pre-pressed together with the distributed mixed material and then subjected to vacuum hardening, no demolding agent needs to be used before the material distribution and the process is simpler. Through a combined use of the leatheroid and the material distribution frame 01, the demolding effect and speed can be avoided from being influenced when the demolding agent is not uniformly coated.

For further illustration, before removing the material distribution frame in step B, individual frame plates of the material distribution frame are inwards compressed. By using the material distribution frame 01 with the frame plates being capable of being turned inwards to realize compression, the edges of the mixed materials within the material distribution frame 01 are compressed to form a comparatively stable edge structure, such that the edges of the materials on the leatheroid will be not scattered after the material distribution frame 01 is removed.

The technical principle of the present invention is described above in conjunction with the embodiments. Such descriptions are only used for explaining the principle of the present invention and shall not be explained as limitation to the protection range of the present invention in any way. Based on the explanation here, one skilled in the art can conceive other embodiments of the present invention without contributing any inventive labor. All such embodiments shall fall into the protection range of the present invention.

The invention claimed is:

1. A material distribution apparatus, comprising a belt material distribution device, wherein the belt material distribution device comprises a material distribution hopper and a conveying belt; the conveying belt is located at a lower portion of the material distribution hopper;
    an upper surface of the conveying belt is inclined;
    the material distribution hopper comprises a first wall and a second wall; the first wall is an inclined wall with an upper end away from the second wall; a discharge outlet is provided below the second wall;
    an upper portion of the second wall is vertically mounted, a lower portion of the second wall comprises a circular arc portion and a discharge portion which forms the discharge outlet with a surface of the conveying belt therebetween so that the blockage of the discharge outlet caused by materials in the material distribution hopper is avoided;
    a tangent direction of a tail end of the discharge portion is in parallel with the upper surface of the conveying belt.

2. The material distribution apparatus according to claim 1, further comprising a material distribution frame located below the belt material distribution device.

3. The material distribution apparatus according to claim 2, further comprising an auxiliary material distribution device provided between the belt material distribution device and the material distribution frame, and a feed inlet of the auxiliary material distribution device is located right below a discharge end of the belt material distribution device.

4. The material distribution apparatus according to claim 3, wherein the auxiliary material distribution device has the same structure with the belt material distribution device.

5. A method of preparing an artificial stone plate by using the material distribution apparatus according to claim 4, wherein the method comprises the following steps:
    A. material distribution: sequentially stacking a leatheroid and a material distribution frame on a transporting device, transporting the leatheroid and the material distribution frame to a position below a belt material distribution device for material distribution through the transporting device such that materials fail from the belt material distribution device to the material distribution frame, and performing pre-pressing through the material distribution device such that a pre-pressed green body with the leatheroid at a bottom portion is obtained;
    B. pressing: removing the material distribution frame, feeding the pre-pressed green body with the leatheroid at the bottom portion into a pressing machine, and covering an upper surface of the pre-pressed green body with another layer of leatheroid and thereafter performing pressing through the pressing machine;
    C. vacuum hardening: performing vacuum vibration and hardening for the stone plate pressed and formed in step B to obtain a crude product; and
    D. leatheroid removal: removing the leatheroid on the upper and lower surfaces of the crude product to obtain the artificial stone plate.

6. A method of preparing an artificial stone plate by using the material distribution apparatus according to claim 3, wherein the method comprises the following steps:
    A. material distribution: sequentially stacking a leatheroid and a material distribution frame on a transporting device, transporting the leatheroid and the material distribution frame to a position below a belt material distribution device for material distribution through the transporting device such that materials fail from the belt material distribution device to the material distribution frame, and performing pre-pressing on the materials through the material distribution device such that a pre-pressed green body with the leatheroid at a bottom portion is obtained;
    B. pressing: removing the material distribution frame, feeding the pre-pressed green body with the leatheroid at the bottom portion into a pressing machine, and covering an upper surface of the pre-pressed green body with another layer of leatheroid and thereafter performing pressing through the pressing machine;
    C. vacuum hardening: performing vacuum vibration and hardening for the stone plate pressed and formed in step B to obtain a crude product; and
    D. leatheroid removal: removing the leatheroid on the upper and lower surfaces of the crude product to obtain the artificial stone plate.

7. The material distribution apparatus according to claim 2, further comprising a transporting device which is used for conveying the material distribution frame, the transporting device being provided below the belt material distribution device located at an upstream position of a transporting direction of the transporting device.

8. The material distribution apparatus according to claim 7, further comprising a cartridge-type material distribution device located at a downstream direction of the transporting direction.

9. The material distribution apparatus according to claim 8, wherein the cartridge-type material distribution device is consisted of a cartridge and a pressing plate, the cartridge being horizontally placed and the pressing plate being provided at a bottom portion of the cartridge, and a bottom portion of the cartridge-type material distribution device is provided with a material outlet.

10. A method of preparing an artificial stone plate by using the material distribution apparatus according to claim 9, wherein the method comprises the following steps:
   A. material distribution: sequentially stacking a leatheroid and a material distribution frame on a transporting device, transporting the leatheroid and the material distribution frame to a position below a belt material distribution device for material distribution through the transporting device such that materials fail from the belt material distribution device to the material distribution frame, and performing pre-pressing on the materials through the material distribution device such that a pre-pressed green body with the leatheroid at a bottom portion is obtained;
   B. pressing: removing the material distribution frame, feeding the pre-pressed green body with the leatheroid at the bottom portion into a pressing machine, and covering an upper surface of the pre-pressed green body with another layer of leatheroid and thereafter performing pressing through the pressing machine;
   C. vacuum hardening: performing vacuum vibration and hardening for the stone plate pressed and formed in step B to obtain a crude product; and
   D. leatheroid removal: removing the leatheroid on the upper and lower surfaces of the crude product to obtain the artificial stone plate.

11. A method of preparing an artificial stone plate by using the material distribution apparatus according to claim 8, wherein the method comprises the following steps:
   A. material distribution: sequentially stacking a leatheroid and a material distribution frame on a transporting device, transporting the leatheroid and the material distribution frame to a position below a belt material distribution device for material distribution through the transporting device such that materials fail from the belt material distribution device to the material distribution frame, and performing pre-pressing through the material distribution device such that a pre-pressed green body with the leatheroid at a bottom portion is obtained;
   B. pressing: removing the material distribution frame, feeding the pre-pressed green body with the leatheroid at the bottom portion into a pressing machine, and covering an upper surface of the pre-pressed green body with another layer of leatheroid and thereafter performing pressing through the pressing machine;
   C. vacuum hardening: performing vacuum vibration and hardening for the stone plate pressed and formed in step B to obtain a crude product; and
   D. leatheroid removal: removing the leatheroid on the upper and lower surfaces of the crude product to obtain the artificial stone plate.

12. A method of preparing an artificial stone plate by using the material distribution apparatus according to claim 7, wherein the method comprises the following steps:
   A. material distribution: sequentially stacking a leatheroid and a material distribution frame on a transporting device, transporting the leatheroid and the material distribution frame to a position below a belt material distribution device for material distribution through the transporting device such that materials fail from the belt material distribution device to the material distribution frame, and performing pre-pressing on the materials through the material distribution device such that a pre-pressed green body with the leatheroid at a bottom portion is obtained;
   B. pressing: removing the material distribution frame, feeding the pre-pressed green body with the leatheroid at the bottom portion into a pressing machine, and covering an upper surface of the pre-pressed green body with another layer of leatheroid and thereafter performing pressing through the pressing machine;
   C. vacuum hardening: performing vacuum vibration and hardening for the stone plate pressed and formed in step B to obtain a crude product; and
   D. leatheroid removal: removing the leatheroid on the upper and lower surfaces of the crude product to obtain the artificial stone plate.

13. The material distribution apparatus according to claim 2, further comprising a lifting device which is used for controlling the material distribution frame to be raised or lowered, wherein the lifting device is provided below the material distribution frame which is a quadrilateral frame.

14. A method of preparing an artificial stone plate by using the material distribution apparatus according to claim 13, wherein the method comprises the following steps:
   A. material distribution: sequentially stacking a leatheroid and a material distribution frame on a transporting device, transporting the leatheroid and the material distribution frame to a position below a belt material distribution device for material distribution through the transporting device such that materials fail from the belt material distribution device to the material distribution frame, and performing pre-pressing on the materials through the material distribution device such that a pre-pressed green body with the leatheroid at a bottom portion is obtained;
   B. pressing: removing the material distribution frame, feeding the pre-pressed green body with the leatheroid at the bottom portion into a pressing machine, and covering an upper surface of the pre-pressed green body with another layer of leatheroid and thereafter performing pressing through the pressing machine;
   C. vacuum hardening: performing vacuum vibration and hardening for the stone plate pressed and formed in step B to obtain a crude product; and
   D. leatheroid removal: removing the leatheroid on the upper and lower surfaces of the crude product to obtain the artificial stone plate.

15. A method of preparing an artificial stone plate by using the material distribution apparatus according to claim 2, wherein the method comprises the following steps:
   A. material distribution: sequentially stacking a leatheroid and a material distribution frame on a transporting device, transporting the leatheroid and the material distribution frame to a position below a belt material distribution device for material distribution through the transporting device such that materials fail from the belt material distribution device to the material distribution frame, and performing pre-pressing on the materials through the material distribution device such that a pre-pressed green body with the leatheroid at a bottom portion is obtained;

B. pressing: removing the material distribution frame, feeding the pre-pressed green body with the leatheroid at the bottom portion into a pressing machine, and covering an upper surface of the pre-pressed green body with another layer of leatheroid and thereafter performing pressing through the pressing machine;

C. vacuum hardening: performing vacuum vibration and hardening for the stone plate pressed and formed in step B to obtain a crude product; and D. leatheroid removal: removing the leatheroid on the upper and lower surfaces of the crude product to obtain the artificial stone plate.

* * * * *